(12) United States Patent
Dick

(10) Patent No.: US 6,502,350 B1
(45) Date of Patent: Jan. 7, 2003

(54) APPARATUS OR INSTALLATION AND METHOD FOR HYDROPONIC CULTIVATION OF PLANTS

(75) Inventor: James Quinton Cameron Dick, 78 Selbourne Green 5200, East London (ZA)

(73) Assignee: James Quinton Cameron Dick, East London (ZA)

( * ) Notice: Subject to any disclaimer, the term of this patent is extended or adjusted under 35 U.S.C. 154(b) by 0 days.

(21) Appl. No.: 09/720,155

(22) PCT Filed: Apr. 18, 2000

(86) PCT No.: PCT/IB00/00474

§ 371 (c)(1),
(2), (4) Date: Mar. 6, 2001

(87) PCT Pub. No.: WO00/64241

PCT Pub. Date: Nov. 2, 2000

(30) Foreign Application Priority Data

Apr. 21, 1999 (ZA) .............................. 99/2839
Apr. 21, 1999 (ZA) .............................. 99/2840

(51) Int. Cl.$^7$ .............................................. A01G 31/00
(52) U.S. Cl. ...................................... 47/62 R; 47/59
(58) Field of Search ...................... 47/62 R, 60, 61, 47/62 C, 62 E, 62 N, 63, 48.5, 59

(56) References Cited

U.S. PATENT DOCUMENTS

| | | | | |
|---|---|---|---|---|
| 2,585,698 A | * | 2/1952 | Spring | |
| 4,211,034 A | * | 7/1980 | Piesner | 47/62 |
| 4,216,617 A | | 8/1980 | Schmidt | 47/62 |
| 4,302,906 A | * | 12/1981 | Kawabe et al. | 47/62 |
| 4,332,105 A | * | 6/1982 | Nir | 47/1 R |
| 4,514,929 A | | 5/1985 | Lestraden | 47/17 |
| 5,216,836 A | * | 6/1993 | Morris et al. | 47/62 |
| 5,355,618 A | * | 10/1994 | Pedersen | 47/18 |
| 5,428,922 A | * | 7/1995 | Johnson | 47/82 |
| 5,921,018 A | * | 7/1999 | Hirose | 43/132.1 |
| 6,035,578 A | * | 3/2000 | Lo et al. | 47/61 |

FOREIGN PATENT DOCUMENTS

| | | | | |
|---|---|---|---|---|
| EP | 0 300 536 | * | 7/1988 | A01G/31/02 |
| EP | 0533 285 A1 | * | 9/1992 | A01G/31/02 |
| GB | 2030833 A | * | 11/1978 | |
| GB | 2101863 A | * | 6/1982 | |
| GB | 2170688 A | * | 8/1986 | A01G/29/00 |
| GB | 2 170 688 A | | 8/1986 | |
| GB | 2206271 A | * | 6/1987 | |
| JP | 04-229116 | * | 4/1992 | A01G/27/00 |
| JP | 05-15266 | * | 5/1993 | |
| JP | 06-38643 | * | 6/1994 | A01G/31/00 |

* cited by examiner

Primary Examiner—Peter M. Poon
Assistant Examiner—Andrea M. Valenti
(74) Attorney, Agent, or Firm—Woodcock Washburn, LLP

(57) ABSTRACT

An installation and method for hydroponic cultivation of plants are provided together with a plant support structure (56). A water reservoir feeds a water feed network of flow conduits leading to a plurality of upwardly extending plant support structures in the form of columns (56). Each column includes a series of rooting compartments (72) containing rooting medium (68) and extending over its height. Each compartment has a wall provided with at least one opening (92) for permitting the foliage of a plant rooted in the medium to protrude from the compartment. A drainage network of conduits (64, 60, 50, 52, 42) leads from the rooting compartments to the reservoir and a pump (24) is provided for circulating water around the circuit formed by the reservoir, feed network, columns and drainage network. In accordance with the method, the pump intermittently circulates water around the circuit.

11 Claims, 2 Drawing Sheets

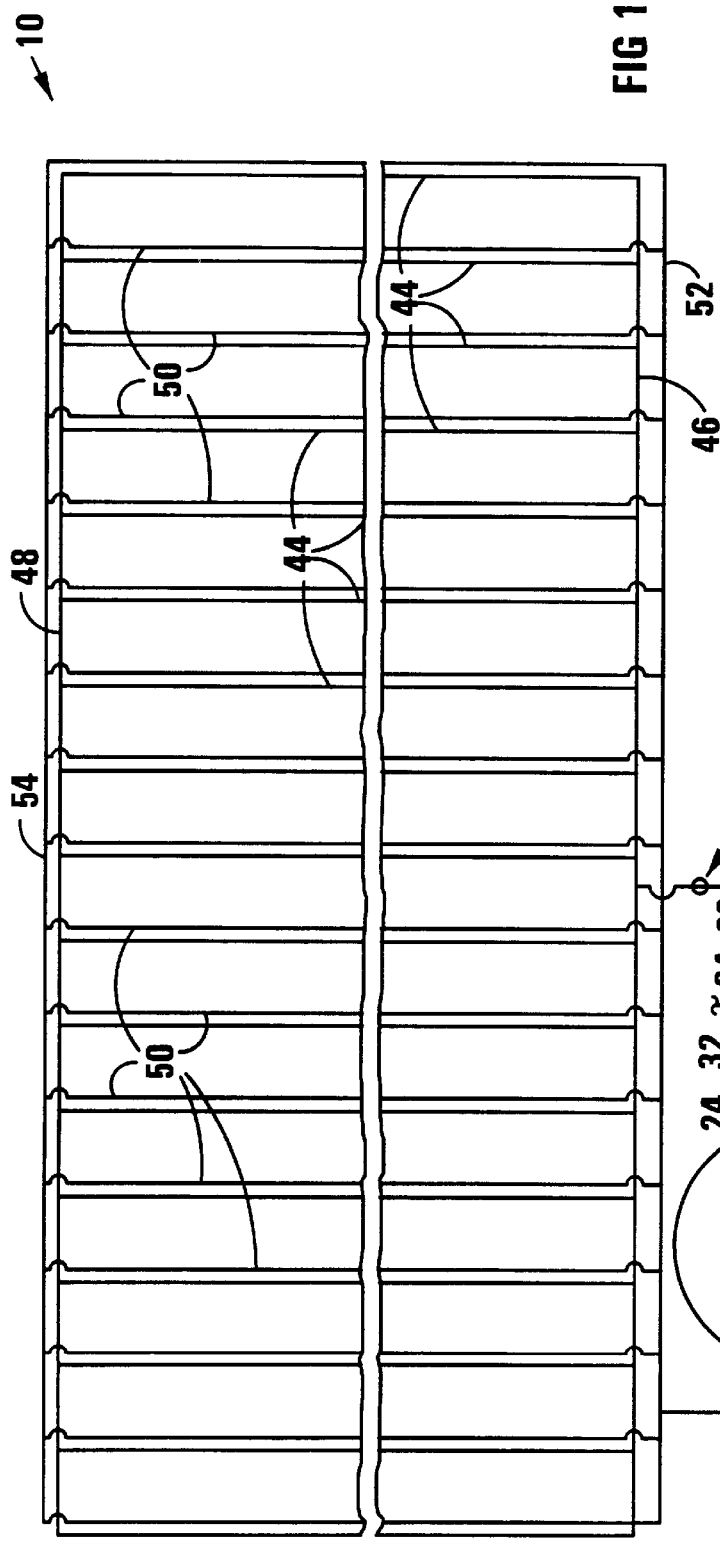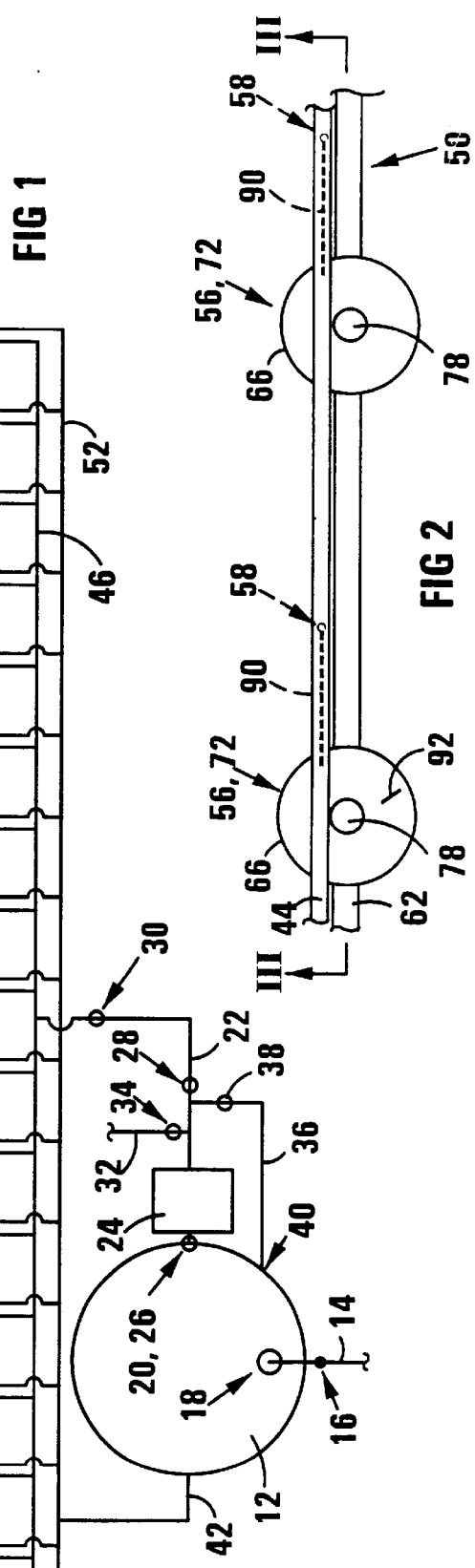

APPARATUS OR INSTALLATION AND METHOD FOR HYDROPONIC CULTIVATION OF PLANTS

This Invention relates, broadly, to hydroponics. More particularly, the invention relates to an apparatus or installation, and to a method, for the hydroponic cultivation of plants, the apparatus or installation, and the method, being suitable for, but not limited to, the hydroponic cultivation of strawberries.

According to one aspect of the invention there is provided an apparatus or installation for the hydroponic cultivation of plants, the apparatus or installation including:

a plurality of horizontally spaced plant support structures each extending upwardly from a lower extremity thereof to an upper extremity thereof, each of which support structures includes a plurality of rooting compartments containing plant rooting medium, the compartments of each structure being arranged in a series extending over the height of the structure and each rooting compartment having a wall provided with at least one opening for permitting foliage of a plant rooted in the rooting medium in the compartment to protrude from the compartment;

a water feed network in flow connection with and fed by a water supply, and including a plurality of water flow conduits leading from the supply to the rooting compartments for conducting water from the supply to each of the rooting compartments;

a water drainage network including a plurality of water drainage conduits in flow connection with and leading away from the rooting compartments, for conducting water away from the rooting compartments; and water circulation means for circulating water from the supply in succession through the feed network, then through the rooting compartments of the support structures and then through the drainage network.

In principle the water circulation means can circulate water from a supply such as a mains water supply, optionally through a nutrient dosing tank where nutrients are added to the water and dissolved therein, once through the apparatus or installation, after which the spent water can be discarded to waste. If, on the other hand, as is often the case, it is desired to re-use the spent water and any dissolved nutrients remaining therein, the water supply may, instead, be a reservoir for holding the water which is fed by the feed network, the feed network being in flow connection with, and being fed with water discharged from, the reservoir, and the water drainage network leading from the rooting compartments to the reservoir for conducting water from the rooting compartments to the reservoir, the reservoir, the water feed network, the rooting compartments of the plant support structures and the water drainage network together forming a water circulation circuit, and the water circulation means forming part of the circuit, for circulating water around the circuit.

The aforegoing sets forth what are regarded as the important features of the broad idea of the apparatus or installation aspect of the invention, the features set forth hereunder being optional features which can be included or omitted from this aspect of the invention, as desired. In particular it is to be noted that when a number of features are grouped together hereunder in a particular optional or preferred embodiment of the invention, this is a matter of choice and it is to be explicitly understood that any one of such features may be altered, omitted or substituted by an equivalent, without expanding on the scope of the invention or extending the disclosure thereof. More particularly, it is explicitly noted that any feature set forth hereunder can be imported into the broad idea of the invention set forth above, without the necessity of importing any other feature of the invention set forth below into that broad idea, whether or not such feature forms part of the same preferred or particular embodiment.

When the various parts of this aspect of the invention are relatively small and portable, being releasably connected or readily disconnectable from one another, it can be regarded as an apparatus; and when they are relatively large and more or less permanently connected to one another, this aspect of the invention can be regarded as an installation.

While each plant support structure may in principle be any structure extending between lower and upper extremities thereof, such as a wall, slab or the like, which provides the series of compartments containing the rooting medium, it is preferably in the form of a plant support column, which may be elongated, the series of compartments extending over the length, ie over the height, of the column. Each plant support column may extend substantially vertically and each plant support column may include a sleeve of flexible material containing the rooting medium, the sleeve being divided by a plurality of constrictions, spaced along the length of the column, into the rooting compartments. Each sleeve may be of water-impermeable plastics sheet material, each constriction being formed by a tie extending circumferentially around the sleeve, for example a plastics plant tie or plastics electrical cable tie, under tension and forming an associated constriction in the sleeve. In other words, each sleeve may be of water-impervious plastics material, each constriction in said sleeve being provided by a tie under tension extending around the associated sleeve, each opening in each compartment wall being provided by a slit in the flexible material.

The water feed network may comprise a water feed reticulation system leading from the reservoir to each plant support structure, there conveniently being a water feed manifold, forming part of the feed reticulation system, extending alongside the series of rooting compartments of each plant support structure, a plurality of irrigation connections, such as self-compensating irrigation nozzles which compensate for variations in supply pressure arising e.g. from differences in static head or height, or irrigation tubes such as capillary tubes or dripper tubes, which irrigation connections may thus be of the drip irrigation type, leading from each water feed manifold respectively into the rooting compartments of the plant support structure associated with that water feed manifold, preferably at a high level into each rooting compartment. The water feed reticulation system may be at a high level, at or above the upper extremities of the plant support structures, each water feed manifold being suspended by, and depending downwardly from, the part of the feed reticulation system upstream thereof. In a particular construction, accordingly, the water flow conduits of the water feed network may include a plurality of water feed manifolds, one for each plant support structure, each water feed manifold extending along the series of rooting compartments of the associated plant support structure, a plurality of irrigation connections, one for each rooting compartment, respectively placing the interior of the water feed manifold in flow communication with the interiors of the rooting compartments; and in this construction the part of the water feed network upstream of the water feed manifolds may include a grid of pipes at a level at or above the upper extremities of the plant support structures, each water feed manifold being suspended by, and depending downwardly from one of the pipes of the grid, the part of the water feed network upstream thereof, each irrigation connection including an irrigation nozzle and discharging into the associated rooting compartment at a level above the midpoint, in the vertical direction, of that compartment.

Similarly, the water drainage network may comprise a water drainage reticulation system leading from each plant support structure to the reservoir, there conveniently being a water drainage manifold, forming part of the water drainage reticulation system, associated with each plant support structure and extending along the series of rooting compartments thereof, the manifold being connected to and in flow communication with the interior of each rooting compartment, for draining water, eg under gravity, from that rooting compartment to the drainage reticulation system. Conveniently the drainage reticulation system is at a low level, at or below the lower extremities of the plant support structures. In a particular construction, eg when the plant support structures are plant support columns, each water drainage manifold may extend along the interior of the associated column, along the series of compartments and through each compartment, there being at least one drainage opening from the interior of each compartment into the interior of the drainage manifold, preferably at a low level in that compartment and below any water feed into that compartment. The drainage manifold may have a plurality of outward projections or protrusions such as shoulders spaced along its length, the protrusions acting respectively to support the constrictions of the sleeve, each protrusion conveniently being spaced closely below the or each drainage opening from the compartment located immediately above that protrusion. In other words, the water drainage network may include a plurality of water drainage manifolds, one for each plant support structure, each water drainage manifold extending along the series of rooting compartments of the associated plant support structure. In this case, each water drainage manifold may extend along the interiors of the rooting compartments of the associated plant support structure, there being at least one drainage opening from each rooting compartment, at a level below the midpoint, in the vertical direction, of that compartment, and leading into the interior of the drainage manifold, the part of the drainage network downstream of the drainage manifolds including a grid of pipes at a level at or below the lower extremities of the plant support structures and the water drainage manifolds projecting upwardly from the pipes of this grid; and each plant support structure may be in the form of a plant support column divided by a plurality of constrictions, spaced along the column, into the rooting compartments, each drainage manifold having a plurality of protrusions standing proud of its outer surface and spaced along its length, each constriction being supported by an associated one of the protrusions and each drainage opening of the rooting compartment above that constriction passing through the drainage pipe at a position closely spaced above the protrusion which supports that constriction.

Typically, the water circulation means will be a pump, between the reservoir and the plant support structures. The pump is preferably downstream in the circuit from the reservoir and upstream from the plant support structures, for pumped flow along the water feed network and gravity flow along the water drainage network, although, instead, the pump may be upstream of the reservoir and downstream of the plant support structures, for pumped flow along the water drainage network and gravity flow along the water feed network.

When the parts of the apparatus are releasably connected to each other, the plant support structures in particular may be releasably connected to the water feed network and the water drainage network, in which case they may be portable to allow them, and plants rooted in their rooting compartments, to be carried to a different environment, such as that provided by a cold room or hothouse, to induce or break dormancy, to accelerate growth, or similarly control plant growth.

The invention extends to a second aspect which is a method for the hydroponic cultivation of plants, the method comprising:

circulating water containing dissolved plant nutrients from a reservoir containing the water along a water feed network comprising a plurality of water flow conduits to a plurality of horizontally spaced upwardly projecting plant support structures;

feeding water from the water feed network into each of the plant support structures, the water fed to each plant support structure being fed separately from the water feed network into each of a plurality of rooting compartments containing plant rooting medium and arranged in a series extending over the height of the plant support structure;

draining water separately from each of the plant rooting compartments of each plant support structure into a water drainage network comprising a plurality of water drainage conduits; and circulating water drained from the rooting compartments along the water drainage conduits from the plant support structures to the reservoir, the plants being cultivated having roots rooted in the rooting medium in the rooting compartments and having foliage protruding from openings in walls of the rooting compartments.

By the rooting compartments' being separately fed from the water feed network, and by the rooting compartments' being separately drained into the water drainage network, is meant that the compartments are fed in parallel with water from the feed network, and drain in parallel into the drainage network, there being no flow of water in series through the compartments.

Circulating the water may be provided by pumping the water, and may be continuous or, preferably, intermittent. The method may include adding make-up water and make-up nutrients to the water, eg in the reservoir, as required. It is further contemplated that, in accordance with the cultivation method of the present invention, the plant support structures can be disconnected from the water feed network and from the water drainage network, thereafter being moved to a cooler or warmer environment, as desired, to induce or break dormancy, to induce flowering or fruiting, or the like, before being reintroduced into the circuit formed, together with the plant support structures, by the reservoir, water feed network and water drainage network. Furthermore, as and when desired, air can be circulated around the circuit, the reservoir and any water circulation means being replaced by a fan or blower. This can act to dry and aerate/oxygenate the plant rooting medium, to remove undesirable gases therefrom, to heat or cool the rooting medium with hot or cold air, and/or to introduce gaseous disinfectants or pesticides such as methyl bromide to the rooting medium. Indeed, the circulating water containing plant nutrients can be used to carry dissolved pesticides to the rooting medium.

The invention extends further to a plant support structure for an apparatus or installation for the hydroponic cultivation of plants, the structure including a plurality of plant rooting compartments for holding plant rooting medium for rooting at least one plant in each compartment with the foliage of the plant outside the compartment, the compartments being arranged in a series extending between a pair of spaced extremities of the structure, the structure further including a hollow water drainage manifold in the form of a conduit having a wall defining a hollow interior of the manifold, the manifold being connected to the series of compartments with its interior in communication with the interior of each compartment, there being a separate connection for each compartment, for draining water from the compartments.

The support structure is thus adapted to have the plant rooting compartments receive water in parallel from a water feed network, the rooting compartments discharging such water in parallel into the drainage manifold, e.g. through a porous part of the manifold wall in each compartment, or preferably through an opening in the manifold wall in each compartment.

The structure may be in the form of an elongated column, the spaced extremities being at opposite ends of the column, the column including a sleeve of flexible material containing particulate plant rooting medium, the sleeve being divided by a plurality of constrictions, spaced along the length of the column, into the rooting compartments. The drainage manifold may extend along the interiors of the rooting compartments from one extremity of the series to the other, the manifold having a plurality of protrusions standing proud of its other surface and spaced along its length, each protrusion being associated with one of the constrictions, the column having an upright condition in which its is oriented with one of the extremities forming a lowermost extremity and the other extremity forming an uppermost extremity, each constriction being supported by the associated protrusion in said upright condition of the column, the sleeve being of impervious material and each constriction being provided by a tie under tension and extending around the associated sleeve.

In a particular embodiment, the drainage manifold may extend along the interiors of the rooting compartments from one extremity of the series to the other, there being at least one drainage opening through the wall of the manifold in each compartment, the drainage opening leading from said compartment into the interior of the manifold, the openings being located at positions in the compartments which permit drainage of water from the compartments when the structure is oriented in an upright condition in which one of the extremities is a lowermost extremity and the other extremity is an uppermost extremity.

Other features of the plant support structure may be as described either hereinabove with reference to the apparatus or installation or method of the present invention, or herebelow with reference to the drawings. In this regard it is explicitly noted that the various features of the various optional or preferred embodiments defined herein of the apparatus or installation, of the method or of the plant support structure need not be employed simultaneously, and some may be retained while others are omitted or have equivalents substituted therefor. Thus, various additional embodiments of the apparatus or installation, of the method and of the present support structure can be made up, using various different combinations of features of the present invention, other than those specifically defined above.

It is contemplated that each support structure will typically be constructed in more or less complete form, with its compartments and plant rooting medium in place, and will be distributed or shipped in this form to users, who will employ the structures in assembling the apparatus or installation of the invention. The compartments may in this case be made without any holes or openings such as slits in their walls for receiving plants or for receiving irrigation water supply nozzles, such holes, openings or slits being made on site by users when the apparatus or installation is assembled and/or when the plants are planted in the rooting medium in the compartments.

It is a major advantage of the invention that each plant support structure or column can support a plurality of plants with the plants in vertically spaced relationship, thereby increasing the plant density in terms of plants/floor area. Thus the number of plants, depending on the height of the plant support structures, which can be cultivated on any surface area, such as on the floor of a cultivation tunnel, can be increased by a factor of 10–40, or more.

The invention will now be described, by way of example, with reference to the accompanying diagrammatic drawings, in which:

FIG. 1 shows a schematic plan view of an installation, in accordance with the invention, for the hydroponic cultivation of strawberries;

FIG. 2 shows a schematic detail, on an enlarged scale, of the installation of FIG. 1.

Figure 3:
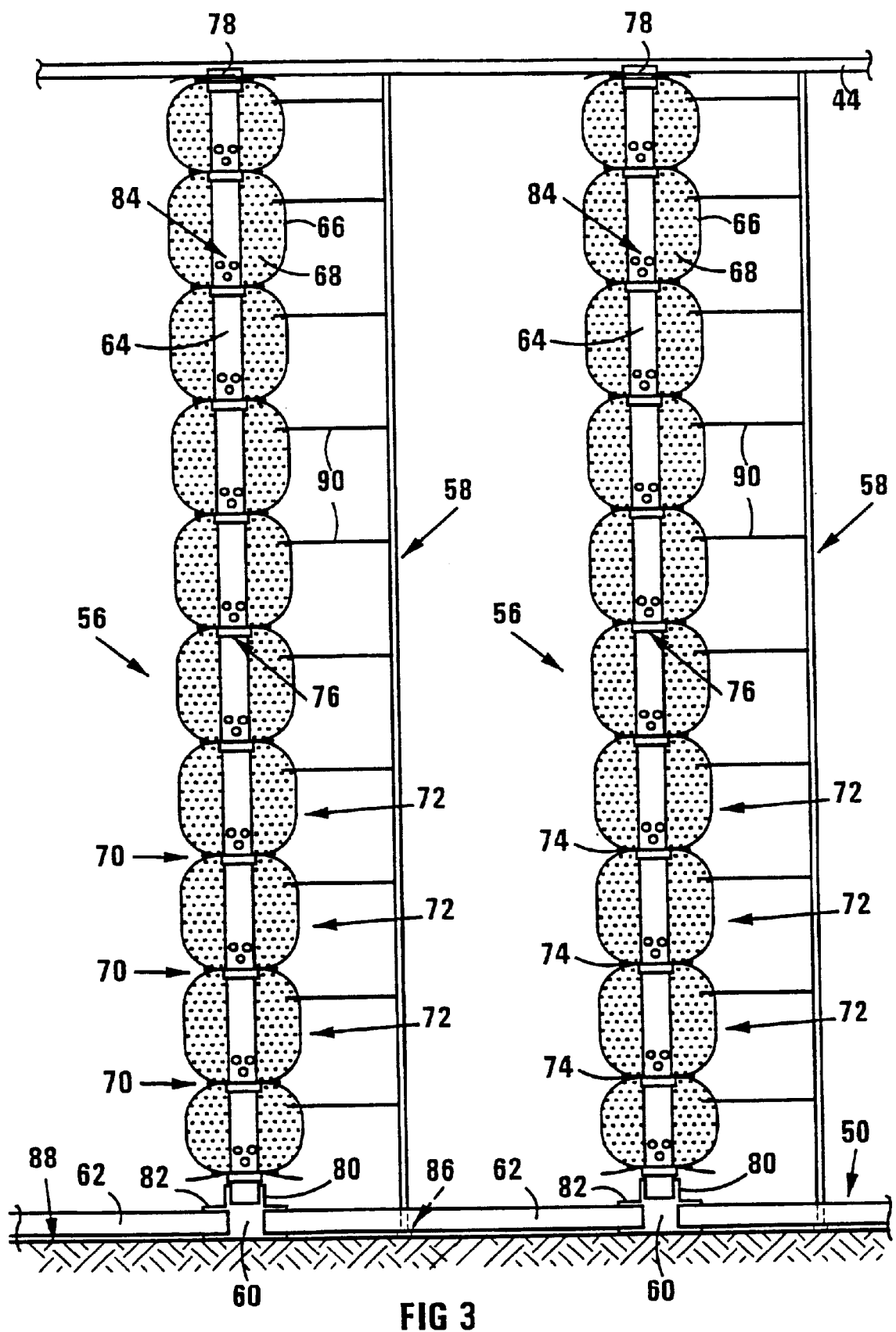
FIG. 3 shows a schematic sectional side elevation, in the direction of line III—III in FIG. 2, of the detail of FIG. 2.

In FIG. 1 of the drawings, reference numeral 10 generally designates an installation, in accordance with the present invention, for the hydroponic cultivation of strawberries. In FIG. 1, which is not strictly to scale, the installation is shown as including a strawberry cultivation area of about 0.5 Ha in size, being elongate rectangular in outline, having a width of about 50 m and a length of about 96 m.

The installation 10 includes a reservoir in the form of a tank 12 having a high level inlet provided with a make-up- or refill water supply line 14 provided with a gate valve 16 and a float valve 18. The tank 12 has a low level outlet 20 feeding into a flow line 22 provided with water circulation means in the form of a pump 24. Downstream of the pump 24, which is shown adjacent the outlet 20 and separated therefrom by a gate valve 26, the flow line 22 has a further gate valve 28 downstream of the pump 24 and a filter 30 downstream of the valve 28. A branch line 32 having a gate valve 34 branches from line 22 between the pump 24 and drains to waste; and a return- or recycle flow line 36, provided with a gate valve 38, branches from the line 22 between the branch line 32 and the valve 28, and feeds back to the tank 12 at 40. A drainage line 42 drains into the tank 12 at a low level.

The flow line 22 feeds into an elevated water feed network including seventeen water flow conduits in the form of a grid of irrigation pipes 44 spaced parallel from one another in series at a high level in a grid arrangement, having opposite ends connected respectively to an elevated manifold pipe 46 at the ends of the pipes 44 adjacent the tank 12 and to an elevated manifold pipe 48 at the ends of the pipes 44 remote from the tank 12. The manifold pipe 48 is optional and can be omitted, the pipes 44 in this case being blind at their ends remote from the pipe 46. Each pipe 44 carries a. series of sixty-two water flow conduits in the form of water feed manifolds, suspended and downwardly depending therefrom, having closed lower ends resting on the ground, the water feed manifolds not being shown in FIG. 1 but being as described hereunder with reference to FIGS. 2 and 3.

Broadly similarly, the drainage line 42 drains into the tank 12 from a water drainage network including a plurality of water drainage conduits in the form of a grid of seventeen low level drainage pipes 50 resting on the ground, spaced apart from one another in series in a grid arrangement corresponding to that of the pipes 44. The pipes 50 extend from a manifold pipe 52, below the manifold pipe 46 and at the ends of the pipes 50 adjacent the tank 12, to a manifold pipe 54 below the manifold pipe 48 and at the ends of the pipes 50 remote from the tank 12. Similarly to the manifold pipe 48, the manifold pipe 54 is optional and can be omitted, in which case the ends of the pipes 50 remote from the manifold pipe 52 will be blind ends. The pipes 50, 52 and 54 rest on the ground. The pipes 50 each carry a series of sixty-two plant support structures in the form of elongate plant support columns comprising rooting compartments and projecting upwardly from the pipes 50. The columns are not shown in FIG. 1 but are described hereunder with reference to FIGS. 2 and 3 and the columns of each pipe 50 are spaced in series along the length of the pipe 50. Each pipe 50 is below, and corresponds with, one of the pipes 44; and each column corresponds with and extends alongside one of the feed manifolds, being in flow communication therewith, as described hereunder with reference to FIGS. 1 and 2. As will emerge hereunder, the water drainage conduits of the water drainage network lead from the rooting compartments of the columns to the reservoir tank 12.

The horizontal spacing between adjacent parallel pipes 44 is the same as the horizontal spacing between adjacent parallel pipes 50, and is 6 m. The spacing between adjacent feed manifolds is the same as the spacing between adjacent plant support columns, and is 800 mm. The feed manifolds at the opposite ends of each series thereof are spaced about 200 mm from the ends of the associated pipe 44 respectively, ie from the pipes 46 and 48. Similarly, the columns at the opposite ends of each series thereof are spaced about 200 mm from the ends of the associated pipe 50 respectively, ie about 200 mm from the pipes 52 and 54. The pipes 44 are of 25 mm outer diameter and the pipes 46 and 48 are of 40 mm outer diameter, being polyethylene pipes with a wall thickness sufficient to contain an internal pressure of at least 6 atmospheres, being pipes with a wall thickness of 1.5 mm or optionally more; and the pipes 50, 52 and 54 are likewise of polyethylene, all being of 50 mm outer diameter and also being able to contain at least 6 atmospheres pressure while being of 1.5 mm wall thickness or optionally more. Instead, the pipes 50, 52 and 54 can optionally be of polyvinyl chloride (PVC) of 63 mm outer diameter; and the pipes 44, 46 and 48 can also, if desired, be of PVC.

The installation 10 has the pipes 50, 52, and 54 resting on bare soil, with the installation uncovered and open to the elements and ambient atmosphere. However, instead, the pipes 50, 52 and 54 may rest on a layer of sand or gravel, or on a concrete or cement apron and may be covered by one or more translucent or transparent plastics plant growth tunnels of the type used for strawberry cultivation to protect the plants from the elements. The floor of each tunnel is typically covered by white, light-reflective sheet material, for reflecting light upwardly, on to plants being cultivated in the tunnel.

As mentioned above, each pipe 44 is more or less directly above the associated pipe 50, with the manifold pipes 46 and 48 being more or less directly above the manifold pipes 52 and 54 respectively. For ease of illustration, the upper pipes 44, 46 and 48 are, however, shown somewhat offset from the corresponding lower pipes 50, 52 and 54 in FIG. 1. The grid of pipes 44 is a high level grid at or slightly above the elevation or level of the tops or upper extremities of the plant support columns, the grid of pipes 50 being a low level grid at or slightly below the elevation or level of the bottoms or lower extremities of the plant support columns.

It should be explicitly noted, however, that, although what is believed to be the best method of carrying out the invention is shown in the drawings, with the grid of pipes 44, 46 and 48 at a high level as shown, recent experiments and the experience of the applicant have shown that the invention can work competitively well, with the grid of pipes 44, 46 and 48, instead of being elevated, being at ground level, i.e. more or less at or slightly below the lower extremities of the support columns, with the pipes 44, 46 and 48 being located alongside the pipes 50, 52 and 54 respectively, substantially as shown in FIG. 1. An advantage of having the grid of pipes 44, 46 and 48 resting on the ground, is that a less robust trellis structure (described below) is needed to support the plant support columns and the associated water feed manifolds (56 and 58 respectively in FIGS. 2 and 3 and described below). In this case the water feed manifolds 58 will project upwardly from the pipes 44, alongside the columns 56, instead of depending downwardly (as shown in FIG. 3).

In FIGS. 2 and 3, the same reference numerals refer to the same parts as in FIG. 1, unless otherwise specified. The detail of FIGS. 2 and 3 shows, essentially, those parts of the installation 10 omitted from FIG. 1, primarily the plant support columns and the water feed manifolds. Part on one of the drainage pipes 50 is shown, supporting two vertically extending plant support columns, each generally designated 56 and each associated with one of the water feed manifolds, generally designated 58.

The centres of the columns 56 are, as indicated above, spaced apart by a spacing along the length of the drainage pipe 50 by a spacing of 800 mm. Each column is supported in the central leg of a T-piece 60, the T-piece 60 being inserted into and forming part of the pipe 50, there being sixty-two T-pieces in each pipe 50 and the pipe 50 being formed from sixty-three portions 62. Each pipe portion 62 is about 0.75 m in length and has its ends which are connected to the T-pieces 60 received spigot/socket fashion, as spigots in sockets constituted by the arms of the associated T-pieces, being glued in position. The T-pieces are of similar polyethylene or PVC construction, diameter and wall thickness, to the pipes 50.

Each column 56 is formed, essentially, of a water drainage manifold in the form of a PVC or polyethylene pipe 64, and of a sleeve 66 of 200 mm diameter, 100 μm thickness flexible water-impervious polyethylene sheet material containing plant rooting medium 68 of compacted particulate organic material such as peat (although synthetic particulate material can be used instead). The PVC sheet material has a white surface and a black surface. Thus, the sleeve 66 is formed to have a white outer surface to reflect incidental ambient light on to plant foliage, and a black inner surface to discourage growth of algae thereon, inside the sleeve 66. Each column 56 is divided by a series of waist-like constrictions 70 spaced along its length, into a series of rooting compartments 72 extending along its length. Each constriction 70 is formed by a PVC or like plastics cable tie 74 of the type usually used for tying together electrical cables. Each tie 74 is tied under tension circumferentially around the sleeve 66 to form one of the constrictions 70. Each tie 74 is tied tightly enough to form a constriction 70 which holds the rooting medium 68 in place in the compartment 72 above that tie 74, and tightly enough to support that compartment 72 on a shoulder 76 on the pipe 64, as described hereunder. The pipe 64 extends along the interiors of the series of rooting compartments 72 of the associated column 56, inside the sleeve 66.

Each pipe 64 is a water drainage conduit forming part of the water drainage network and is provided, standing proud of its outer surface, with a series of protrusions spaced along its length in the form of circumferentially extending radially outwardly projecting ribs or shoulders 76. The pipe 64 is of 50 mm outer diameter and of 1.5 mm wall thickness. The shoulders 76 are formed integrally on the outer surface of the pipe 64 by injection moulding and are 10 mm wide, in the radial direction and 4 mm in the longitudinal (in use vertical) direction. Adjacent shoulders 76 are spaced apart from each other by spacings of 200 mm, except for the uppermost pair and the lowermost pair of shoulders 76, which shoulders 76 are spaced apart by 160 mm. The tie 74 of each constriction 70 is tied sufficiently tightly for that constriction 70 to be securely supported on an associated one of the shoulders 76, as mentioned above. The uppermost and lowermost compartments 72 are thus about 160 mm high, the remainder being about 200 mm high, each 200 mm high compartment being about 5 l in volume.

Recently the applicant has successfully employed a proprietary form of pipe 64 obtained from Clausen Plastics (Proprietary) Limited of Wadeville, Gauteng Province, South Africa, made up of a plurality of PVC or polyethylene pipe lengths which fit together, end-to-end in spigot/socket engagement, to form the pipe 64. Each pipe length is of 50 mm outer diameter, 240 mm overall length (190 mm effective length when fitted together) and 2 mm wall thickness, each pipe length carrying one of the 10 mm wide and 4 mm thick shoulders described above, integrally moulded therewith adjacent one end thereof, and having two appropriately located rings of drainage openings (see 84 as described hereunder with reference to FIG. 3) respectively adjacent opposite ends thereof. The lengths are releasably locked together by means of a proprietary locking mechanism forming part of each pipe length. In use a plurality of lengths are locked together, end-to-end, in spigot/socket engagement. The lengths each have a spigot portion at one end and a socket portion at the other, in which the drainage openings are provided, the shoulder being at the end of the length provided with the spigot portion, and, at each spigot/socket connection, the drainage openings of the spigot portion registering with the drainage openings of the associated socket portion. There is one pipe length associated with each compartment, eg ten pipe lengths for ten compartments, all the compartments thus typically being the same height and size, unlike the arrangement shown in FIG. 3, as the pipe lengths are all of the same length.

The upper end of each pipe 64 is closed off by a plastics cap 78, adhesively secured thereto; and the lower end of each pipe is a releasable (unglued) friction fit in the central leg of the associated T-piece, the leg of the T-piece being designated 80 and its arms being designated 82. Two longitudinally spaced rings of circumferentially spaced drainage openings 84 are provided, adjacent and closely spaced above each shoulder 76, except for the uppermost shoulder, the lower ring being 20 mm above the adjacent shoulder 76 and the upper ring being 20 mm above the lower ring and 40 mm above said shoulder. The openings 84 are at a level below the midpoint, in the vertical direction, of the associated compartment 72 and lead into the interior of the pipe 64.

Each feed manifold 58 is in the form of a 15 mm outside diameter polyethylene pipe having an upper end mechanically and releasably connected by proprieary connecting means to an opening therefor in the associated pipe 44 and depends downwardly from the pipe 44. The manifold 58 has a closed lower end closed by a cap 86 which rests on the ground, the ground being illustrated at 88 in FIG. 3. The columns 56 and the associated manifolds 58 and grid of pipes 44, 46 and 48 are supported by a suitable trellis structure (not shown) made up of wire and support posts. A water flow conduit formed by an irrigation connection including an irrigation nozzle in the form of a tube 90 projects into each compartment 72 of each column 56, from the associated manifold 58. Each tube 90 has an upstream end provided with an external circumferential rib or shoulder (not shown) received and mechanically secured and held in an opening therefor in the wall of the pipe 58, and a downstream end projecting into an associated one of the rooting compartments 72, through an opening or slit therefor, formed in the sleeve 66. The downstream end of the tube 90 is held fictionally in position by the rooting medium 68, into which it protrudes at a high level, above the midpoint, in the vertical direction, of the associated rooting compartment 72, the rings of openings 84 being below that midpoint. Each tube 90 is connected to the pipe 58 by a self-regulating flow regulator, in the form of a drip irrigation fitting or nozzle of conventional construction (not shown).

During normal use of the installation 10, irrigation water containing dissolved plant nutrients is intermittently pumped by the pump 24 from the tank 12, with the valves 16, 26, 28 and 38 open, and the valve 34 closed. The pump 24 pumps this water through the tank outlet 20 and along lines 22 and 36, the valves 28 and 38 having their apertures adjusted so that about two-thirds of the output of the pump 24 passes along the line 22 from the valve 28 to the filter 30, the remaining third of this output being recycled along line 36 to re-enter the tank 12 at 40.

Water flowing along line 22 downstream of the filter 30 enters manifold pipe 46 and flows in parallel along irrigation pipes 44 to manifold pipe 48. From each pipe 44 water flows down the associated water feed manifolds 58 to the associated tubes 90, along which tubes 90 the water flows in parallel to the associated rooting compartments 72 where it enters the rooting medium 68 from the downstream ends of the tubes 90. Water entering the compartments 72 saturates the rooting medium 68 therein, the water draining downwardly under gravity through the rooting medium 68 until it reaches the rings of drainage openings 84, through which it drains into the associated drainage manifold 64. Thus water drains downwardly under gravity in the manifolds 64 into the drainage pipes 50. From the pipes 50 the water drains into the manifold pipe 52, and then into the drainage line 42 along which it drains into the tank 12. Thus, in essence, the pump 24 circulates water along a water circulation network constituted by the reservoir or tank 12, by the plant support structures or columns 56, by the water feed network of pipes 22, 44, 46 and 48 and manifolds 58 and tubes 90, and by the water drainage network of pipes 42, 50, 52, 54 and 64.

It will be appreciated that, during normal use of the installation 10, there will be a plurality of strawberry plants rooted in the rooting medium 68 of each rooting compartment 72. The stems of the plants will protrude out of the rooting compartment 72 via a plurality of openings in the form of holes or slits (one of which is shown at 92 in FIG. 2) through the wall of the compartment 72 constituted by the material of the sleeve 66. These holes or slits are equally circumferentially spaced from one another in series, eg at a spacing of 90° apart when seen from above, around each compartment 72, being located at a level above the midpoint of the compartment 72, to resist loss of water by unintended drainage of water outwardly through the holes or slits to the exterior of the sleeve 66, there being a total of four holes or slits in each compartment, each about 25 mm in diameter or length respectively, for rooting four plants in each compartment.

From time to time, as and when necessary, the pumping is interrupted, for example by an automatic timer switch, to allow the rooting medium to drain and dry out as fully as possible, and to become aerated/oxygenated, before pumping is resumed. As a consequence of water transpiration by the strawberry plants, water is conducted by the plants from the rooting medium 68 into the ambient atmosphere outside the sleeve 66, where it is lost by evaporation. Accordingly, automatically and from time to time as required, water in tank 12 is replenished via supply line 14 and float valve 18, the gate valve 16 remaining open during normal operation. Furthermore, as dissolved nutrients in the water are consumed by the plants, their concentrations can be measured in the water in the tank 12, the nutrients being replenished by addition thereof to the water in the tank, when necessary.

While the aforegoing represents the basic application of the method of the present invention, a number of refinements thereof are contemplated. Thus, as indicated above, the plant support columns, with growing plants thereon, can be removed from the remainder of the installation and transported to colder conditions, such as a colder geographical location or a cool room, to be induced to flower and fruit out of season by exposure to cooler temperatures, eg strawberries being induced to flower by cooling to −0.5° C. Furthermore, heating and cooling of plants can be effected by circulating warm or cold air along the circuit of the installation, along the interiors of the columns 56. This not only aerates and oxygenates the rooting medium 68, but removes gaseous respiration by-products therefrom, which removal is desirable. If desired, carbon dioxide can be circulated through the rooting compartments 72, to regulate or stimulate plant growth.

Conveniently gases are injected into the compartments 72 in the reverse direction to irrigation water, being blown up the pipes 64 of the columns 56 and through the holes 84 into the compartments 72, and out of the slits into the ambient air. Furthermore, temperatures in the compartments can be regulated, as desired, both to promote growth, and to promote flowering and fruiting, eg by maintaining temperatures of 10–18° C., suitable for growing strawberries which, in common with certain other plants, are resistant to flowering above 18° C. and grow slowly, if at all, below 10° C. This heating and/or cooling can be of the roots of the plants in the compartments 72 and of the plant foliage, outside the compartments 72, air bleeding out of the slits, and over the foliage. If desired, electrical resistance heating cable can be wrapped around the tubes 64 in the compartments 72, for electrical resistance heating of the rooting medium 68.

From time to time, as desired, the installation can have its circuit, and the rooting compartments in particular, fumigated, for example by means of methyl bromide blown along the circuit, with the slits in the compartments sealed with tape or the like.

Irrigation can be carried out at a rate such that unacceptable build-up of salts in the rooting medium 68 is resisted, without any substantial water loss, and pure water can, if desired be used from time to time for this purpose.

The invention, particularly as illustrated with reference to the drawings, has a number of advantages, namely:

good use of area is achieved, by growing the plants in a three dimensional volume, strawberry plant densities of up to 400,000 or more plants/hectare being achievable;

strawberry plants elevated from the ground on the columns are easily accessible to pickers, and can be harvested with reduced bending by pickers;

use of black and white PVC sheeting enhances light usage, light penetration and light intensity for good fruiting and fruit growth, and reduces algal growth;

as the rooting compartments are supported above the ground, low levels of disease and parasite infestation, and high levels of sanitation, are promoted;

control of insect pests is facilitated by keeping the plants off the ground, and effective spraying of insecticides is promoted, by high concentrations of plants/unit area;

cultivation can, within limits, be largely independent of climate and can be independent of soil conditions;

effective irrigation, which lends itself to automation, is promoted, together with good soil aeration/oxygenation for good root development in superior rooting media which can resist water logging;

heating and/or cooling of plants to break dormancy and to promote flowering and fruiting is made possible while heating is made fuel-efficient by concentrating it on the plants;

labour requirements can be reduced, for irrigation and also for harvesting and weeding/cleaning;

complex and expensive trellis superstructures for suspending growing medium in bags from above are avoided by seating the grid of drainage pipes on the ground and by using it to support the plant support columns in an upright condition;

sedimentation and the need for flushing can be reduced or avoided, and the rooting compartments can, if necessary, be flushed with water which is drained into the tank and not lost;

irrigation of individual plants is facilitated, because the method is relatively insensitive to the height or elevation of the individual rooting compartments, each compartment being fed with the same amount of water by its own irrigation tube;

good irrigation of individual plants is also facilitated because the compartments are arranged in parallel, and not in series, as regards water flow, so that no plants in any compartment are unduly favoured compared with the plants of other compartments, and no compartment drains into any other compartment;

because the rooting compartments are irrigated in parallel, they tend to remain wet or dry for similar periods of time, which facilitates even control of plant irrigation and respiration, and facilitates removal of unwanted by-products, which promotes an even rate of rooting medium decomposition in the rooting compartments;

application of gaseous plant treatment substances such as carbon dioxide or methyl bromide, by blowing gases up the column interiors, is facilitated; and movement of the plants from place to place, by moving the plant support columns, is facilitated; and each column individually supports plants, rooted in its compartments above the ground, in reliable fashion.

Finally, while the method and apparatus or installation, and their dimensions, have been particularly described with reference to cultivation of strawberries, dimensions will naturally be altered, as appropriate, for other plants, as will the specific details of the cultivation method.

I claim:

1. An apparatus or installation for the hydroponic cultivation of plants, the apparatus or installation including:

a plurality of horizontally spaced plant support structures, each extending upwardly from a lower extremity thereof to an upper extremity thereof, each of which support structures includes a plurality of plant rooting compartments containing plant rooting medium for rooting at least one plant in each compartment with the foliage of the plant outside the compartment, the compartments of each structure being arranged in a series extending between the lower extremity and the upper extremity spaced above the lower extremity over the height of the structure and each rooting compartment having a wall provided with at least one opening for permitting foliage of a plant rooted in the rooting medium in the compartment to protrude from the compartment, the structure further including a hollow water drainage manifold in the form of a conduit having a wall defining a hollow interior of a manifold, the manifold being connected to the series of compartments with its interior in communication with the interior of each compartment, there being a separate connection for each compartment, for draining water from the compartments, the plant support structure being in the form of an elongated column, the spaced extremities being at opposite ends of the column, the column including a sleeve of flexible material containing plant rooting medium, and the sleeve being divided by a plurality of constrictions spaced along the length of the column into the rooting compartments, the drainage manifold extending along the interiors of the rooting compartments from one extremity of the series to the other, the manifold having a plurality of protrusions standing proud of its outer surface and spaced along its length, each protrusion being associated with one of the constrictions, each constriction being supported by the associated protrusion, the sleeve being of water-impervious material and each constriction being provided by a tie under tension and extending around the associated sleeve;

a water feed network in flow connection with and fed by a water supply, and including a plurality of water flow conduits leading from the supply to the rooting compartments for conducting water from the supply to each of the rooting compartments;

a water drainage network including a plurality of water drainage conduits in flow connection with and leading away from the rooting compartments, for conducting water away from the rooting compartments; and water circulation means for circulating water from the supply in succession through the feed network, then through the rooting compartments of the support structures, and then through the drainage network, the water flow conduits of the water feed network including a plurality of water feed manifolds, one for each plant support structure, each water feed manifold extending along the series of rooting compartments of the associated plant support structure, a plurality of irrigation connections, one for each rooting compartment, respectively placing the interior of the water feed manifold in flow communication with the interiors of the rooting compartments.

2. An apparatus or installation as claimed in claim 1, in which the water supply is a reservoir for holding the water which is fed by the feed network, the feed network being in flow connection with, and being fed with the water discharged from, the reservoir, and the water drainage network leading from the rooting compartments to the reservoir for conducting water from the rooting compartments to the reservoir, the reservoir, the water feed network, the rooting compartments of the plant support structures and the water drainage network together forming a water circulation circuit, and the water circulation means forming part of the circuit, for circulating water around the circuit.

3. An apparatus or installation as claimed in claim 1, in which each sleeve is of plastics material each opening in each compartment wall being provided by a slit in the flexible material.

4. An apparatus or installation as claimed in claim 1, in which the part of the water feed network upstream of the water feed manifolds includes a grid of pipes at a level at or above the upper extremities of the plant support structures, each water feed manifold being suspended by, and depending downwardly from, one of the pipes of the grid, each irrigation connection including an irrigation nozzle and discharging into the associated rooting compartment at a level above the midpoint, in the vertical direction, of that compartment.

5. An apparatus or installation as claimed in claim 1 in which there is at least one drainage opening through the wall of the drainage manifold, from each rooting compartment, and a level below the midpoint, in the vertical direction, of that compartment, and leading into the interior of the drainage manifold, the part of the drainage network downstream of the drainage manifolds including a grid of pipes at a level at or below the lower extremities of the plant support structures and the water drainage manifolds projecting upwardly from the pipes of this grid.

6. An apparatus or installation as claimed in claim 5, in which each drainage opening of each rooting compartment passing through the drainage manifold wall at a position closely spaced above the protrusion which supports the constriction immediately below that rooting compartment.

7. Amended for the hydroponic cultivation of plants, the method comprising:

circulating water containing dissolved plant nutrients from a reservoir containing the water along a water feed network comprising a plurality of water flow conduits to a plurality of horizontally spaced upwardly projecting plant support structures;

feeding water from the water feed network into each of the plant support structures, the water fed to each plant support structure being fed separately from the water feed network into each of a plurality of rooting compartments containing plant rooting medium and arranged in a series extending over the height of the plant support structure, the rooting compartments of each plant support structure being divided from one another in series by constrictions therebetween;

draining water separately from each of the plant rooting compartments of each plant support structure into a water drainage network comprising a plurality of water draining conduits; and circulating water drained from the rooting compartments along the water drainage conduits from the plant support structures to the reservoir, the plants being cultivated having roots rooted in the rooting medium in the rooting compartments and having foliage protruding from openings in walls of the rooting compartments, the feeding of the water from the water feed network separately into each of the rooting compartments being from a plurality of water feed manifolds, one for each plant support structure and extending along the series of rooting compartments of the associated plant support structure, via a plurality of irrigation connections, one for each rooting compartment, the irrigation connections respectively placing the interior of each water feed manifold in flow connection with the interiors of the rooting compartments of the associated plant support structure, and the draining of water separately from each of the plant rooting compartments of each plant support structure into the water drainage network being via a plurality of water drainage manifolds, one for each plant support structure, each water drainage manifold extending along the series of rooting compartments of the associated plant support structure, the method further comprising:

locating each water drainage manifold in the interior of the associated plant support structure;

forming each of the constrictions by tying a tie under tension around a flexible wall of the plant support structure to constrict the wall inwardly towards the drainage manifold; and supporting each constriction on one of a plurality of protrusions standing proud of the manifold and spaced along its length, the draining of the water from the rooting compartments into the associated water drainage manifold being through a drainage connection in each compartment of the plant support structure, draining into the manifold.

8. A plant support structure for an apparatus or installation for the hydroponic cultivation of plants, the structure including a plurality of plant rooting compartments for holding plant rooting medium for rooting at least one plant in each compartment with the foliage of the plant outside the compartment, the compartments being arranged in a series extending between a pair of spaced extremities of the structure, the structure further including a hollow water drainage manifold in the form of a conduit having a wall defining a hollow interior of the manifold, the manifold being connected to the series of compartments with its interior in communication with the interior of each compartment, there being a separate connection for each compartment, for draining water from the compartments, the plant support structure being in the form of an elongated column, the spaced extremities being at opposite ends of the column, the column including a sleeve of flexible material containing plant rooting medium, and the sleeve being divided by a plurality of constrictions spaced along the length of the column into the rooting compartments, the drainage manifold extending along the interiors of the rooting compartments from one extremity of the series to the other, the manifold having a plurality of protrusions standing proud of its outer surface and spaced along its length, each protrusion being associated with one of the constrictions, the column having an upright condition in which it is oriented with one of the extremities forming a lowermost extremity and the other extremity forming an uppermost extremity, each constriction being supported by the associated protrusion in said upright condition of the column, the sleeve being of water-impervious material and each constriction being provided by a tie under tension and extending around the associated sleeve.

9. A plant support structure as claimed in claim 8 in which there is at least one drainage opening through the wall of the manifold in each compartment, the drainage opening leading from said compartment into the interior of the manifold, the openings being located at positions in the compartments which permit drainage of the water from the compartments when the structure is oriented in its said upright condition.

10. A plant support structure as claimed in claim 9, in which there is at least one said drainage opening through the wall of the drainage manifold, from each rooting compartment, at a level below the midpoint, in the vertical direction, of that compartment when the structure is oriented in its upright condition.

11. A plant support structure as claimed in claim 10, in which each drainage opening of each rooting compartment passes through the drainage manifold wall at a position closely spaced above the protrusion which supports the constriction immediately below that rooting compartment, when the structure is oriented in its upright condition.

* * * * *

UNITED STATES PATENT AND TRADEMARK OFFICE
CERTIFICATE OF CORRECTION

PATENT NO. : 6,502,350 B1
DATED : January 7, 2003
INVENTOR(S) : James Quinton Cameron Dick It is certified that error appears in the above-identified patent and that said Letters Patent is hereby corrected as shown below:

<u>Title page,</u>
Item [56], References Cited, FOREIGN PATENT DOCUMENTS, delete second occurrence of "GB    2 170 688 A  *    8/1986";

<u>Column 6,</u>
Line 55, delete "a." and insert therefor -- a --;

<u>Column 9,</u>
Line 16, delete "1" and insert therefor -- ℓ --;
Line 60, delete "proprieary" and insert therefor -- proprietary --;

<u>Column 14,</u>
Line 26, please delete "Amended" and insert therefor -- A method --.

Signed and Sealed this

Twentieth Day of January, 2004

JON W. DUDAS
*Acting Director of the United States Patent and Trademark Office*